United States Patent
Pavlovski

(10) Patent No.: US 11,500,112 B2
(45) Date of Patent: Nov. 15, 2022

(54) GAMMA-RAY SPECTRUM CLASSIFICATION

(71) Applicant: Symetrica Limited, Southampton (GB)

(72) Inventor: Georgi Pavlovski, Southampton (GB)

(73) Assignee: Symetrica Limited, Southampton (GB)

( * ) Notice: Subject to any disclaimer, the term of this patent is extended or adjusted under 35 U.S.C. 154(b) by 608 days.

(21) Appl. No.: 16/550,543

(22) Filed: Aug. 26, 2019

(65) Prior Publication Data

US 2020/0116879 A1 Apr. 16, 2020

(30) Foreign Application Priority Data

Oct. 10, 2018 (GB) ..................................... 1816503

(51) Int. Cl.
*G01T 3/06* (2006.01)
*G06N 3/04* (2006.01)
*G06T 7/30* (2017.01)
*G06T 15/08* (2011.01)

(52) U.S. Cl.
CPC ........... *G01T 3/065* (2013.01); *G06N 3/0454* (2013.01); *G06T 7/30* (2017.01); *G06T 15/08* (2013.01); *G06T 2207/10072* (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

| 6,150,655 | A | 11/2000 | Odom et al. |
| 7,547,887 | B2 | 6/2009 | Ramsden et al. |
| 7,711,661 | B2 | 5/2010 | Gentile |
| 2007/0294059 | A1 | 12/2007 | Gentile et al. |
| 2008/0067390 | A1 | 3/2008 | Ramsden |

(Continued)

FOREIGN PATENT DOCUMENTS

| CN | 102713676 A | * 10/2012 | ............. G01T 1/167 |
| CN | 106714804 A | * 5/2017 | ........... A61K 31/519 |
| CN | 107392130 A | * 11/2017 | ........... G06K 9/0063 |

(Continued)

OTHER PUBLICATIONS

C. Bellinger, N. Japkowicz and C. Drummond, "Synthetic Oversampling for Advanced Radioactive Threat Detection," 2015 IEEE 14th International Conference on Machine Learning and Applications (ICMLA), 2015, pp. 948-953, doi: 10.1109/ICMLA.2015.58.*

(Continued)

*Primary Examiner* — Jiangeng Sun
(74) *Attorney, Agent, or Firm* — Renner, Otto, Boisselle & Sklar, LLP

(57) ABSTRACT

A gamma-ray spectrum classification apparatus, comprising circuitry configured: to provide a denoising autoencoder to receive gamma-ray spectrum data representing a gamma-ray spectrum of a material to be classified and to determine feature data indicative of one or more features representative of the gamma-ray spectrum data; and to provide a classification neural network to receive the feature data and to classify the material to be classified as one of a plurality of predetermined classifications using the feature data.

11 Claims, 7 Drawing Sheets

(56) References Cited

U.S. PATENT DOCUMENTS

| | | | |
|---|---|---|---|
| 2016/0093048 | A1 | 3/2016 | Cheng et al. |
| 2020/0044899 | A1* | 2/2020 | Chen .................... G06N 3/0454 |

FOREIGN PATENT DOCUMENTS

| | | | |
|---|---|---|---|
| EP | 3 367 329 | A1 | 8/2018 |
| GB | 2560174 | A | 9/2018 |
| WO | 92/13315 | | 8/1992 |
| WO | 2018/042211 | A1 | 3/2018 |
| WO | 2018/046412 | A1 | 3/2018 |

OTHER PUBLICATIONS

Shea, D. A., Moteff, J. D. and Morgan, D. 2010. "Advanced Spectroscopic Portal Program: Background and Issues for Congress," CRS Rep. Congr. RL34750, https://fas.org/sgp/crs/homesec/RL34750.pdf.

Ely, James, Richard Kouzes, John Schweppe, Edward Siciliano, Denis Strachan, and Dennis Weier. 2006. "The Use of Energy Windowing to Discriminate SNM from NORM in Radiation Portal Monitors." Nuclear Instruments & Methods in Physics Research. Section A, Accelerators, Spectrometers, Detectors and Associated Equipment 560 (2): 373-87, https://drive.google.com/open?id=13TxbucL4D_r3xil6JDtf6Yp2bUtc3-IR.

Kamuda, M., J. Stinnett, and C. J. Sullivan. 2017. "Automated Isotope Identification Algorithm Using Artificial Neural Networks." IEEE Transactions on Nuclear Science 64 (7): 1858-64, https://www.osti.gov/servlets/purl/1367506.

Chen, Liang, and Yi-Xiang Wei. 2009. "Nuclide Identification Algorithm Based on K-L Transform and Neural Networks." Nuclear Instruments & Methods in Physics Research. Section A, Accelerators, Spectrometers, Detectors and Associated Equipment 598 (2): 450-53, https://drive.google.com/open?id=0BwPesOipedaCaUVsQVcwUzRna2JhQ3F1NFJ4YW8tMW5VdHVv.

Yoshida, Eiji, Kiyoshi Shizuma, Satoru Endo, and Takamitsu Oka. 2002. "Application of Neural Networks for the Analysis of Gamma-Ray Spectra Measured with a Ge Spectrometer." Nuclear Instruments & Methods in Physics Research. Section A, Accelerators, Spectrometers, Detectors and Associated Equipment 484 (1-3): 557-63, https://drive.google.com/open?id=0BwPesOipedaCSIpNajNyZFV2dmZQcEgtLUgyYy1UZIdJQkJF.

Pilato, V., F. Tola, J. M. Martinez, and M. Huver. 1999. "Application of Neural Networks to Quantitative Spectrometry Analysis." Nuclear Instruments & Methods in Physics Research. Section A, Accelerators, Spectrometers, Detectors and Associated Equipment 422 (1-3): 423-27, https://drive.google.com/open?id=0BwPesOipedaCcW5WY241QWRteTIhb1FhSI9tbm4tUIVnMzFF.

Meng, L. J., and D. Ramsden. 2000. "An Inter-Comparison of Three Spectral-Deconvolution Algorithms for Gamma-Ray Spectroscopy." IEEE Transactions on Nuclear Science 47 (4): 1329-36, https://drive.google.com/open?id=0BwPesOipedaCRXNgbnE1Tk05Yk9QWIZzY0RSUDNCWXd6aTVR.

He, Kaiming, Xiangyu Zhang, Shaoqing Ren, and Jian Sun. 2015. "Deep Residual Learning for Image Recognition," http://arxiv.org/abs/1512.03385.

Chen, Hu, Yi Zhang, Mannudeep K. Kalra, Feng Lin, Yang Chen, Peixi Liao, Jiliu Zhou, and Ge Wang. 2017. "Low-Dose CT with a Residual Encoder-Decoder Convolutional Neural Network (RED-CNN)." https://doi.org/10.1109/TMI.2017.2715284, https://arxiv.org/abs/1702.00288.

Liu, Jinchao, Margarita Osadchy, Lorna Ashton, Michael Foster, Christopher J. Solomon, and Stuart J. Gibson. 2017. "Deep Convolutional Neural Networks for Raman Spectrum Recognition: A Unified Solution." https://doi.org/10.1039/C7AN01371J, https://arxiv.org/abs/1708.09022.

Examination Report issued from European Patent Office for corresponding regional European Patent Application No. 19 201 735.8, dated Jan. 31, 2022.

\* cited by examiner

GAMMA-RAY SPECTRUM CLASSIFICATION

This application claims priority to British Patent Application No. 1816503.5 filed on Oct. 10, 2018, which is hereby incorporated herein by reference.

BACKGROUND

Field of the Disclosure

The present disclosure relates to gamma-ray spectrum classification.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

There is currently a widespread use of drive-through radiation portal monitors at border crossing points in order to detect any undeclared radioactive materials concealed in vehicles or containerised cargo. These portals were mostly installed following the 9-11 terrorist attack on the World Trade Centre and were widely, and rapidly, deployed around the borders of the United States. There was a particular need to detect the presence of illicit Special Nuclear Materials (SNM).

In these early days, simple, large area, plastic scintillation detectors were used to identify those vehicles or containers that carried radioactive materials. Those shipments were then diverted to a location within the 'port' where a subsequent manual inspection was made in order to identify the nature of the radioactive material using a hand-held instrument. A decision could then be made regarding the nature of the threat. This process was both slow and labour intensive so that delays at border crossings became a problem.

As a consequence, an effort was made around 2005 [1] to develop more sophisticated Advanced Spectroscopic Portal systems that were required to be both more sensitive and to have a better ability to identify the nature of the radioactive materials. However, this programme did not yield the anticipated performance improvement [2].

In parallel, progress was made in developing an ability to discriminate SNM from materials emitting naturally occurring radiation. This was achieved using large volume plastic scintillation counters. The technique involved the selection of a number of regions in the raw energy-loss spectra that were recorded as a vehicle passed through the radiation portal. The ratios between the count-rates recorded in these multiple energy-windows were used to discriminate naturally occurring radiation materials (NORM) cargo from loads containing more threatening radioactive materials or radio-pharmaceuticals. The effectiveness of this technique was reviewed in 2006 [3].

In subsequent years, greater effort was made to improve the performance of larger-volume plastic scintillators as gamma-ray spectrometers. This development included contributions to the optical design of these large volume detectors to improve the quality of the recorded energy-loss spectra [13], a method for deriving the most probable incident spectrum from the energy-loss spectrum recorded by the detector [14], and a way to combine the spectra from multiple detectors reliably through the use of a continuous calibration and stabilisation system in conjunction with each detector [15, 16].

There remains a need, however, to improve the efficiency and reliability with which such a portal system can distinguish between NORM and potential threat materials.

SUMMARY

The present disclosure is defined by the claims.

The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
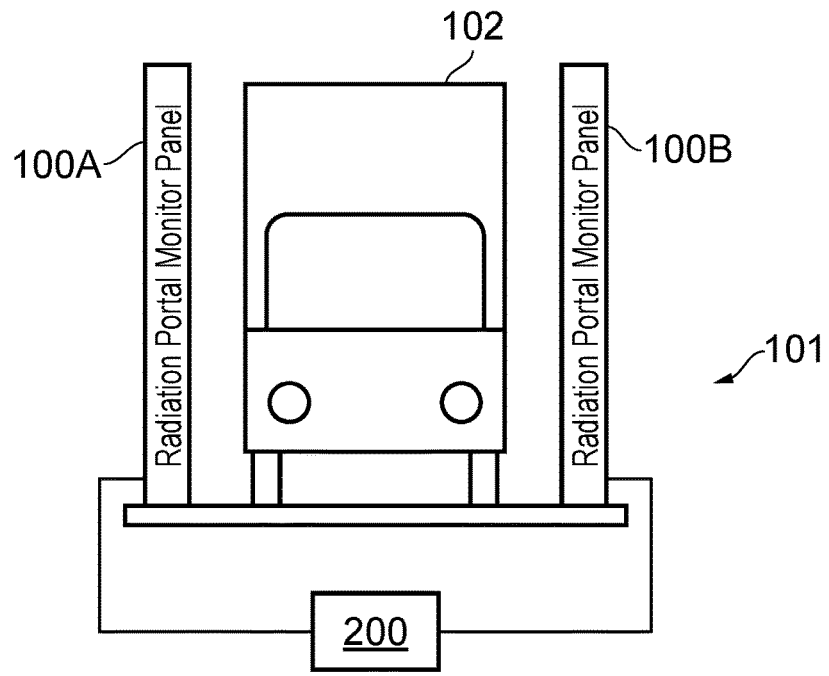
FIG. 1 schematically shows a Radiation Portal Monitor (RPM) according to an embodiment.

Referring now to the drawings, wherein like reference numerals designate identical or corresponding parts throughout the several views.

The present technique uses deep learning to distinguish between the gamma-ray signatures of NORM and those of more threatening radioactive materials more efficiently and reliably. Examples of how the present technique can be applied are given. In one example, the present technique is used to process the gamma-ray spectral data recorded by radiation portal monitors during the transit of vehicles or containerised cargo. In such a case, to achieve the required detection sensitivity, large-volume plastic detectors are needed. In another example, the present technique is used to process the gamma-ray spectral data recorded by a hand-held gamma-ray isotope identifier based on crystal spectrometer having much better spectral-resolution. Such an instrument would be capable of identifying a wide range of radio-isotopes. In another example, the present technique is used to provide a mobile detector system to recognise the presence of a threat source in the presence of a highly variable natural radioactive background.

Deep learning is a method of finding data representation using artificial neural networks. Deep learning methods are known and have been successfully applied to many diverse data rich fields in computer vision, natural language processing, machine translation, etc. Deep learning networks can be taught how to process inputs to get a particular output. The networks are constructed of sequential layers of computational units. The network is said to be 'deep' if it has more than one layer. In each layer computational units take inputs from units in the previous layer and output to those in the next. Mathematically, a deep network defines a function in high-dimensional space. The function is adjusted by changing the processing done in the computational units of the layers. This amounts to a change in how outputs of one layer are weighted in the next. The network tunes the function during a training phase, which uses a set of input-output examples. For example, a deep learning system can take images as inputs and corresponding image labels as outputs. The weights in the computational units are automatically tuned in the optimisation process until the network learns to assign correct labels to the input images. The network's deep structure provides the ability to take advantage of useful features and patterns that recur across the inputs.

The universality of deep learning and the high level of accuracy that it delivers in those applications which rely on pattern matching has led to some interest in gamma-ray spectroscopy applications [4]. The technique was also explored in some earlier work [5], [6] and [7]. The early work mainly focused on usage of a neural network to associate the extracted features, like peak positions or other components, with the correct isotopes. The more recent approach in [4] applied simple, dense neural networks with one hidden layer to synthetic gamma-ray spectra. In the dense network, every neuron in a layer is connected to all neurons in the previous layer.

The networks used in this earlier work are unlikely candidates for use in realistic scenarios. The inputs used to train the networks were very homogeneous and the sizes of the training datasets were relatively small. They also exclusively targeted stationary crystal scintillator based detectors in laboratory conditions. For any realistic deployment of such an instrument, issues are likely to arise such as those related to possible overfitting of the data and poor ability to generalise the technique to unseen data. Another limitation is the choice of the network architecture. Deep, dense neural networks with only few layers cannot achieve very high accuracy in the image recognition tasks, whereas very deep, dense networks are difficult to train.

The present technique allows deep learning to be applied to interpreting spectra recorded by plastic detectors. Such spectra have very few features and appear to be very smooth. The smoothness is due to the fact that the main interaction process of gamma photons within the detector body is through Compton-scattering. Since, during the scattering process, a fractional transfer of energy is possible, the resulting spectral features such as the Compton edges are broad and smooth.

In view of this, in an embodiment, the detected spectra are first deconvolved using a suitable deconvolution technique to enhance the feature definition. A suitable deconvolution technique is described in [8] and [9], for example. The deconvolution process helps to restore peak structure. The deconvolution process of [8] and [9] is performed using an accurate physical model of the detector system. The resulting most likely incident spectrum has more features. However, the shape and the location of those features vary due to noise resulting from the low signal-to-noise quality that is often the characteristic of real data. Also, scattering in the local environment of the radiation portal monitor affects the spectral shapes. Thus, following deconvolution, deep convolutional neural networks are used to find and correctly categorise the systematic features of the deconvolved spectra.

Modern image recognition systems employ deep residual convolutional neural networks (e.g. ResNet) with great success [10]. Embodiments of the present technique use similar architecture to ResNet for the task of spectra classification. The classification network is trained using the real data provided by the cargo manifest information acquired at various deployment and test locations. To achieve high accuracy and to mitigate against possible overfitting of the noisy inputs, a separate denoising autoencoder is used. In one embodiment, a deep convolutional residual denoising autoencoder, similar in architecture to the network proposed in [11] is used. The autoencoder is trained on a separate large dataset of unlabelled spectra and acts as a filter to remove some uncertainty that is present in the spectra due to the Poissonian nature of the radiation. The autoencoder is used to generate the input for the classification network. It is noted that convolutional neural networks have been shown to be useful for other spectroscopic applications [12].

In an embodiment of the present technique, in order to achieve a sufficiently high detection sensitivity to permit the identification of radioactive sources concealed in cargo during its passage through a radiation portal monitor (RPM), it is often necessary to combine the signals from multiple, identical, independently stabilised plastic scintillator counters. The resulting combined energy-loss spectrum is then subjected to the above-described spectral-deconvolution process to generate the most probable incident gamma-ray spectrum detected during the transit of the vehicle through the RPM. The model of the detector's response (as a function of gamma-ray energy) used for the deconvolution process is constructed using simulations of the physical detector which capture detailed information related to the design of the portal monitor detector system.

The resulting most-probable incident spectrum is then passed to the deep convolutional denoising autoencoder. This neural network is used to discover spectral-features reliably within the relatively low quality, noisy, input spectra. This neural network is capable of learning an efficient way of representing this input data and has been previously trained using an extensive database of spectra recorded during many earlier vehicle transits through the portal system.

The output of the autoencoder is passed to the second, classification neural network which determines the nature of the radioactive source. This network has also been trained using an extensive database of vehicle transits through the portal system, stationary tests, etc. This time, however, the manifest data has been used to label the recorded spectra with the nature of the source (the manifest data used to train the autoencoder, on the other hand, does not need to be labelled). For example, the signature of naturally occurring radiation may be identified by the manifest as being produced by one of a wide range of NORM products, such as sanitary ware, fertilizer, etc. If the recorded spectrum is found by the classification neural network as not being consistent with a NORM classification, then the vehicle can then be detained for a more detailed investigation using a hand-held spectrometer.

FIG. 1 shows a Radiation Portal Monitor (RPM) 101 according to an embodiment. Two detector panels 100A and 100B are placed apart (e.g. approximately 4 metres apart) on either side of the road. The detector panels 100A and 100B are in communication with a data processing apparatus 200. A vehicle 102 passes through the checkpoint. The vehicle travels at a predetermined approximate speed (e.g. at around 8 km/hr). Each detector panel houses multiple gamma-ray detectors. Each gamma-ray detector generates a respective energy-loss spectrum of gamma radiation (gamma-ray spectrum) detected by that detector. The data representing the gamma-ray spectrum generated by each gamma-ray detector is referred to as gamma-ray data. This may be referred to as the gamma-ray data generated by each gamma-ray detector. Gamma-ray detectors, such as plastic scintillator detectors (in particular, polyvinyl-toluene scintillator detectors) and crystal scintillator detectors are known in the art and are therefore not discussed in detail here.

When the vehicle enters the portal, a break-beam signal (implemented using a suitable break-beam apparatus, not shown) is provided to the data processing apparatus 200 (via communication interface 205). In response, the controller 206 initiates the recording of the gamma-ray data during the vehicle transit. The gamma-ray data is captured over a predetermined approximate time period. This is typically a few seconds (e.g. 5 seconds). The captured gamma-ray data of each detector is provided to the data processing apparatus 200.

Figure 2:
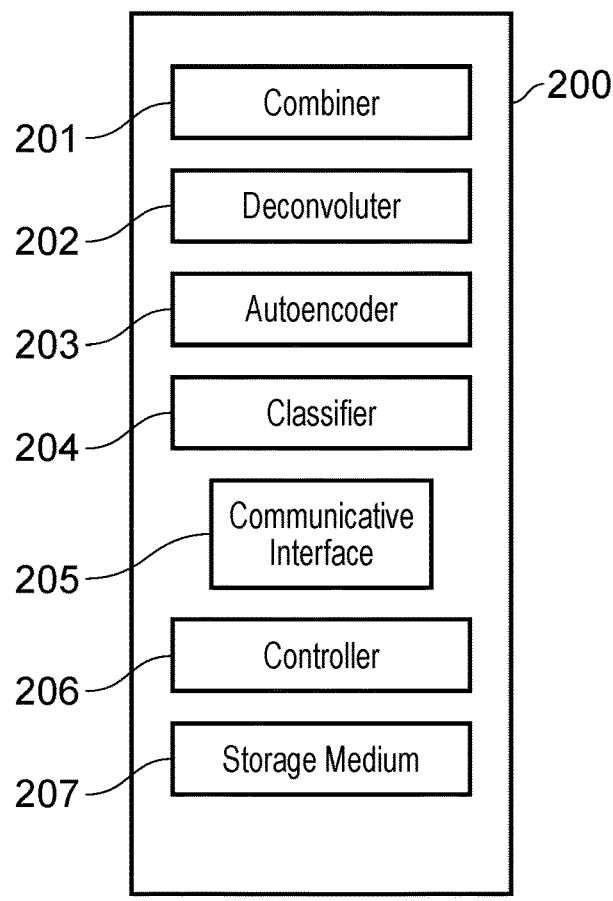
FIG. 2 schematically shows a data processing apparatus according to an embodiment.

As shown in FIG. 2, the data processing apparatus 200 comprises a combiner 201, a deconvoluter 202, a autoencoder 203, a classifier 204, a communication interface 205, a controller 206 and a storage medium 207. The communication interface 205 is for sending electronic information to and/or receiving electronic information from one or more of the other devices (in particular, detector panels 100A and 100B). The storage medium 207 (e.g. in the form of a hard disk drive, solid state drive, tape drive or the like) is for long term storage of electronic information. The combiner 201, deconvoluter 202, autoencoder 203, classifier 204 and controller 206 are implemented by one or more processors (not shown) for processing electronic instructions and memory (not shown) for storing the electronic instructions to be processed and input and output data associated with the electronic instructions. The controller 206 controls the operation of each of the combiner 201, deconvoluter 202, autoencoder 203, classifier 204, communication interface 205 and storage medium 207. The controller 206 also controls, via the communication interface 205, the operation of the detector panels 100A and 100B (e.g. controlling the detector panels 100A and 100B to start and stop collection of gamma-ray spectra data). Each of the combiner 201, deconvoluter 202, autoencoder 203, classifier 204, communication interface 205, controller 206 and storage medium 207 are implemented by appropriate circuitry, for example.

The combiner 201 combines the data from the multiple detectors in order to generate a higher intensity, combined gamma-ray spectrum (the data representing the combined gamma-ray spectrum is referred to as combined gamma-ray data). This allows the captured gamma radiation to be analysed even for a low gamma-ray source intensity (which may be only a few hundred kilobecquerels, for example). In order to maintain a combined gamma-ray spectrum of good quality for use in the subsequent signal processing stages, gamma-ray data is only combined from identical detectors that are well stabilised and continuously calibrated in order to avoid the impact of changing environmental conditions. The combining of gamma-ray data from multiple detectors is known in the art and is therefore not described in detail here [15, 16]. In an embodiment, the integrity of the combined spectrum is preserved by only using spectra that are continuously calibrated and have been stabilised against temperature fluctuations.

The combined gamma-ray data is then passed to the deconvoluter 202 which performs the above-mentioned spectral-deconvolution processing on the data. Most RPMs currently make use of large volume plastic detectors (e.g. polyvinyl-toluene detectors) that are relatively inexpensive compared with crystal scintillation spectrometers that offer better spectral-resolution. Deconvolution of the combined gamma-ray data improves the feature definition of the combined gamma-ray spectrum when plastic detectors are used, thereby providing improved classification performance of the system.

Figure 3A:
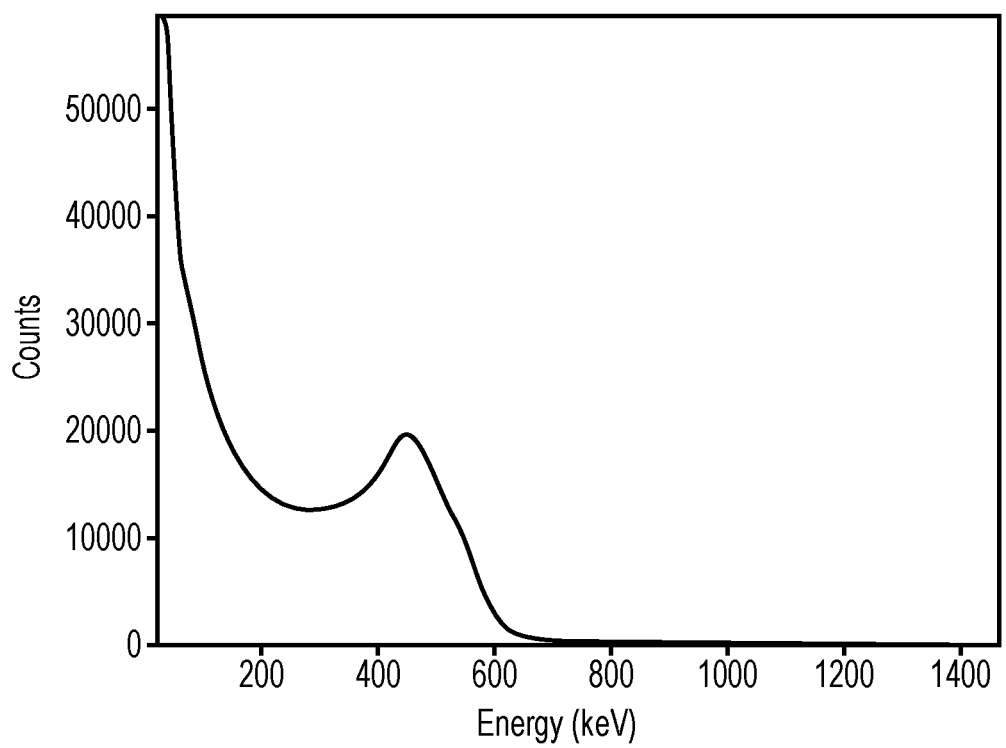
FIGS. 3A and 3B show, respectively, a raw energy-loss spectrum of a Cs-137 source as captured by a large plastic detector and a large NaI (TI) spectrometer.
Figure 3B:
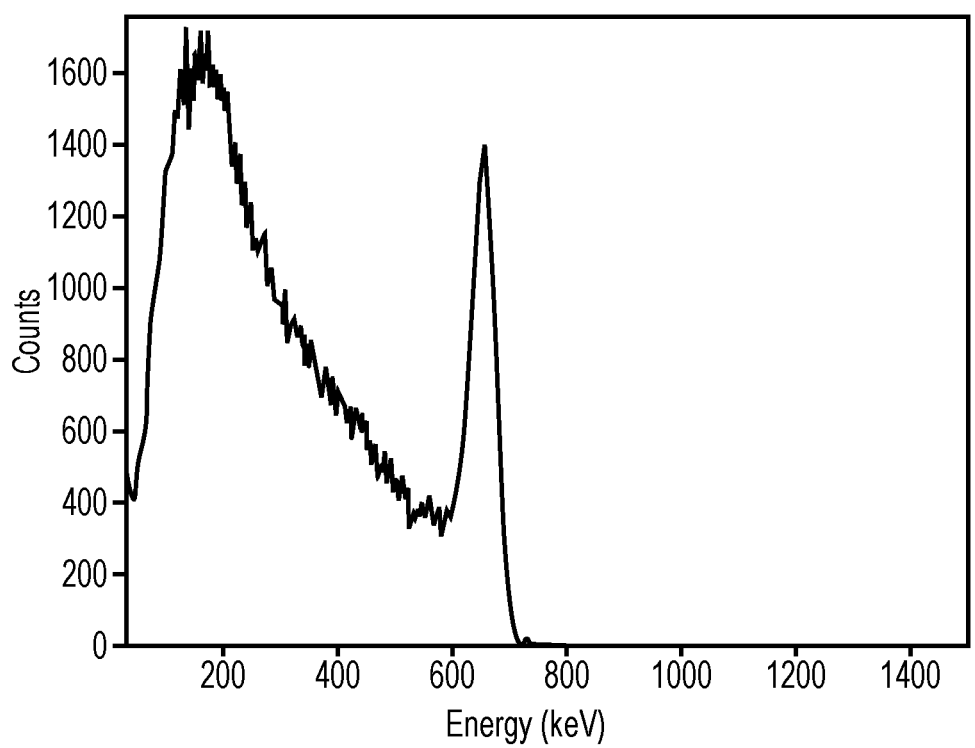
Figure 4A:
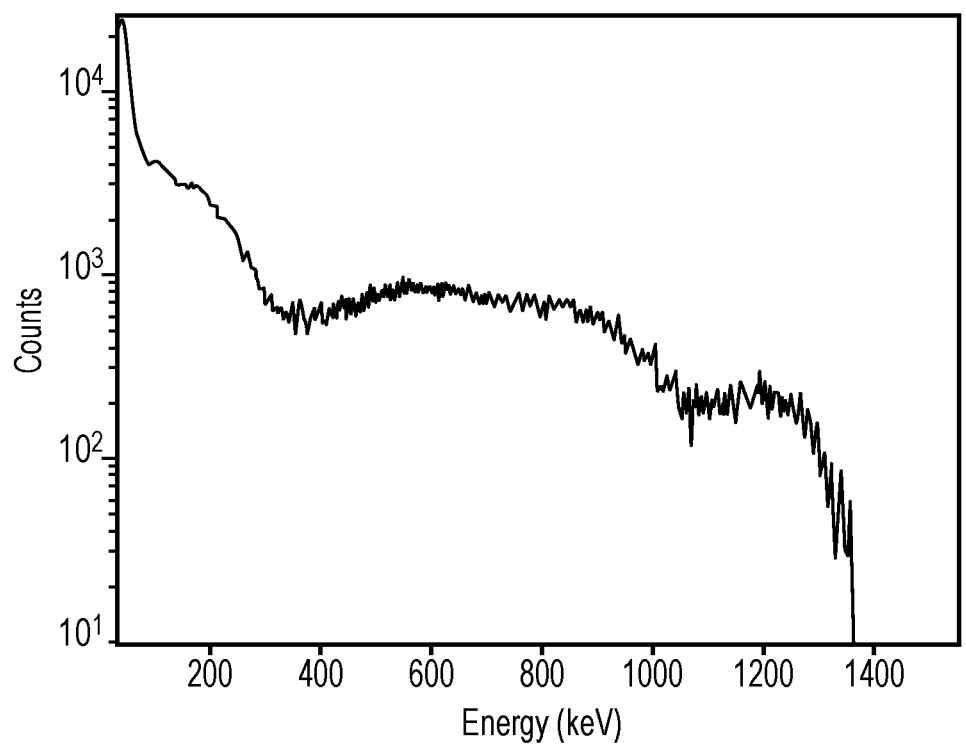
FIGS. 4A and 4B show an improvement in the quality of spectral information provided by a large plastic detector.
Figure 4B:
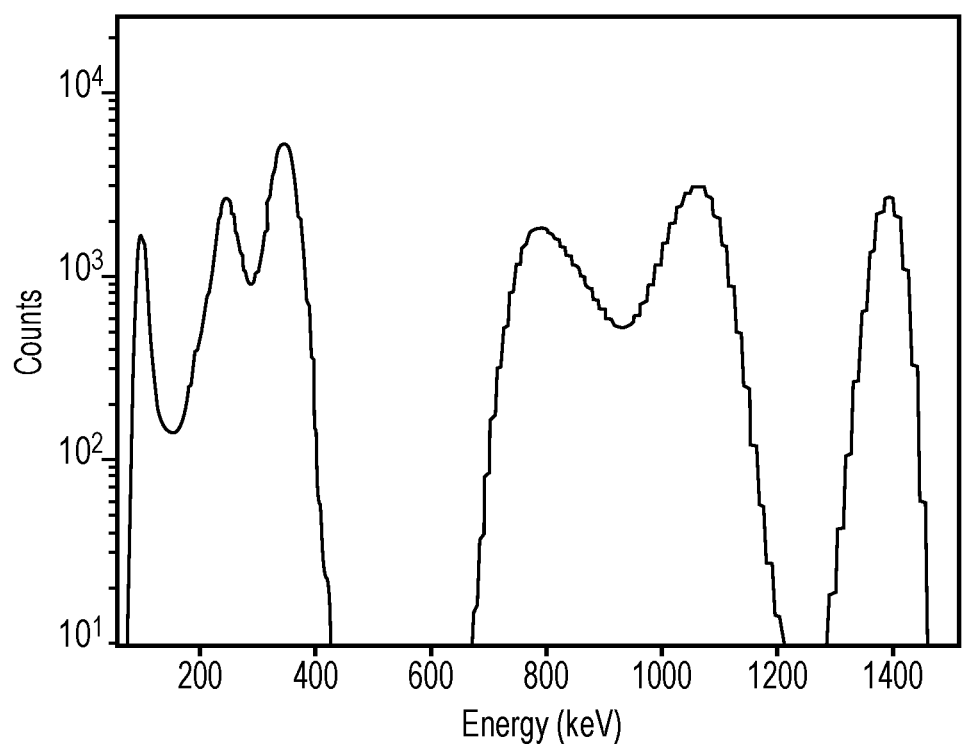

To demonstrate the use of spectral-deconvolution processing, FIGS. 3A and 3B show, respectively, the raw energy-loss spectrum of a Cs-137 source as captured by a large plastic detector and a large NaI (TI) spectrometer (an example of a crystal detector). The raw data from the plastic detector (FIG. 3A) is dominated by the Compton edge and there is little or no indication of a full-energy peak (as detected by the crystal detector in FIG. 3B). However, enriched spectral information derived from a large plastic detector can be improved through the application of a spectral-deconvolution technique such as that described in [8] and [9]. This process requires the use of a detailed, pre-computed model of the energy-response of the detector for use in this deconvolution process. The improvement in the quality of the spectral information provided by a large plastic detector is illustrated in FIGS. 4A and 4B. FIG. 4A shows the raw energy-loss spectrum when the detector is exposed to an Eu-152 source whilst FIG. 4B shows the most likely incident spectrum generated by subjecting the raw energy-loss spectrum to spectral-deconvolution. It will be appreciated that a number of features of the detected gamma radiation are more clearly defined following the spectral-deconvolution process.

The deconvoluted combined gamma-ray data is then passed to the autoencoder 203. The autoencoder 203 is an artificial neural network which is capable of learning an efficient representation of the combined gamma-ray data. It finds useful features of the input data by learning how to reconstruct it using these features. The training is unsupervised, since no explicit outputs are defined. In one example, autoencoders learn to reconstruct the inputs. However, this is not the only type of autoencoder network. In an embodiment, the autoencoder 203 learns to recover noise-reduced output from a noisy input by finding useful patterns in the data. As noted above, convolutional computational units are found to be most useful for finding patterns in image data. In an embodiment, for spectral processing of the combined gamma-ray spectrum, a deep convolutional denoising autoencoder is used as the autoencoder 203. The architecture of the deep convolutional denoising autoencoder used is similar to the one used in [11] for medical image processing. The autoencoder 203 is used to alleviate uncertainty in the data that arises from the random nature of the incident radiation and to define features for the classifier 204. The classifier 204 is a classification neural network trained to assign category labels to the inputs.

Figure 5A:
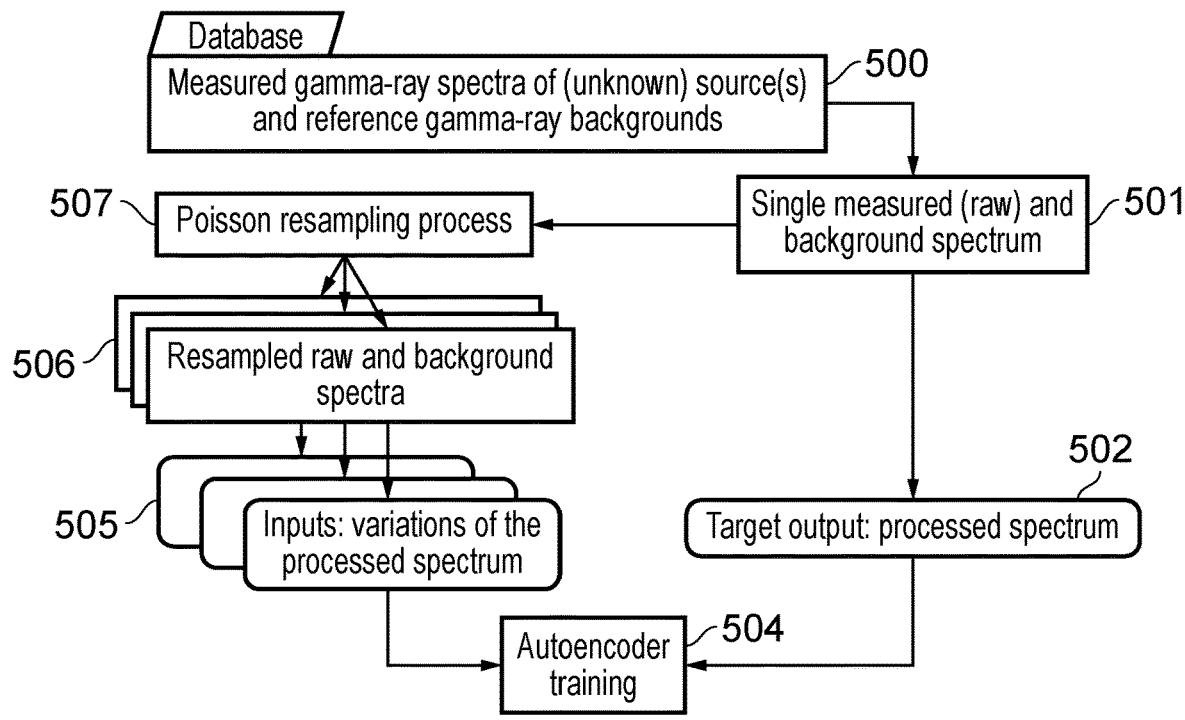
FIGS. 5A to 5C relate to a denoising autoencoder according to an embodiment.

The process of generating the inputs and the outputs for training the autoencoder 203 is shown in FIG. 5A. The autoencoder is trained using batches of input spectra, generated by Poisson resampling from a single input. The autoencoder network learns how to mitigate changes in the shape of the spectra due to the Poissonian nature of the radiation.

More specifically, a database 500 (stored in storage medium 207) is provided comprising one or more sample gamma-ray spectra. Each sample gamma-ray spectrum is a previously determined gamma-ray spectrum of a sample material. The sample material does not need to be labelled. The database also comprises a plurality of background gamma-ray spectra.

At step 501, a training gamma-ray spectrum from the database is combined with a background gamma-ray spectrum from the database. This results in a single, training gamma-ray spectrum. The training gamma-ray spectrum is provided as a target output of the autoencoder 203 at step 502. The training gamma-ray spectrum is used to generate a number of inputs to the autoencoder. The inputs are generated by subjecting the training gamma-ray spectrum to a Poisson resampling process (step 507). The resulting resampled training gamma-ray spectra 506 are then provided to the autoencoder 203 as inputs (step 505). The autoencoder 203 implements a training algorithm (step 504) which calculates appropriate weights for reconstructing the original training-gamma ray spectrum (provided as a target output at step 502) from the resampled inputs. Various appropriate Poisson resampling and autoencoder training algorithms are known in the art, and will therefore not be discussed in detail here.

This process is repeated for multiple sample gamma-ray spectra and background gamma-ray spectra combinations. For example, if there are M (where M is a positive integer) sample gamma-ray spectra $S_1, S_2, \ldots, S_M$ which are respectively combined with M background gamma-ray spectra $B_1, B_2, \ldots, B_M$, then the process is repeated for all combinations $(S_1, B_1), (S_2, B_2), \ldots, (S_M, B_M)$. The resampling creates the sets $(S_1\_1, B_1\_1), (S_1\_2, B_1\_2), (S_1\_K, B_1\_K), (S_2\_1, B_2\_1), (S_2\_2, B_2\_2), \ldots, (S_2\_K, B_2\_K), \ldots, (S_N\_1, B_N\_1), \ldots, (S_M\_K, S_M\_K)$ (where K is a positive integer). The initial set of M measurements is thus enlarged by a factor of K (number of samples in the resampling), which represents the noise effects. The autoencoder is trained to reconstruct the original $(S_m, B_m)$ from the resampled set $(S_m\_1, B_m\_1), \ldots, (S_m\_K, B_m\_K)$ for all $m=1, \ldots, M$. The training finds the set of weights in the convolutional layers of the autoencoder that minimises the difference between the resampled and the original measurements. This makes the autoencoder de-noising.

In another embodiment, rather than the background gamma-radiation spectrum used for determining the weights used by the autoencoder 203 being predetermined and stored in the database 500, a background gamma-ray spectrum is captured by the RPM prior to its use. This newly captured background gamma-ray spectrum is then combined with each sample gamma-ray spectrum (as previously described) in order to generate a set of weights for the autoencoder 203 to use during active use of the RPM. This allows a bespoke set of weights to be determined for the autoencoder 203 depending on the gamma-ray background at the location at which the RPM is to be deployed. This allows the RPM to be portable and to be calibrated depending on the gamma-ray background at its current location (thereby maintaining an improved quality in the denoising and feature extraction performance of the autoencoder 203 even when the RPM is moved between different locations).

Figure 5B:
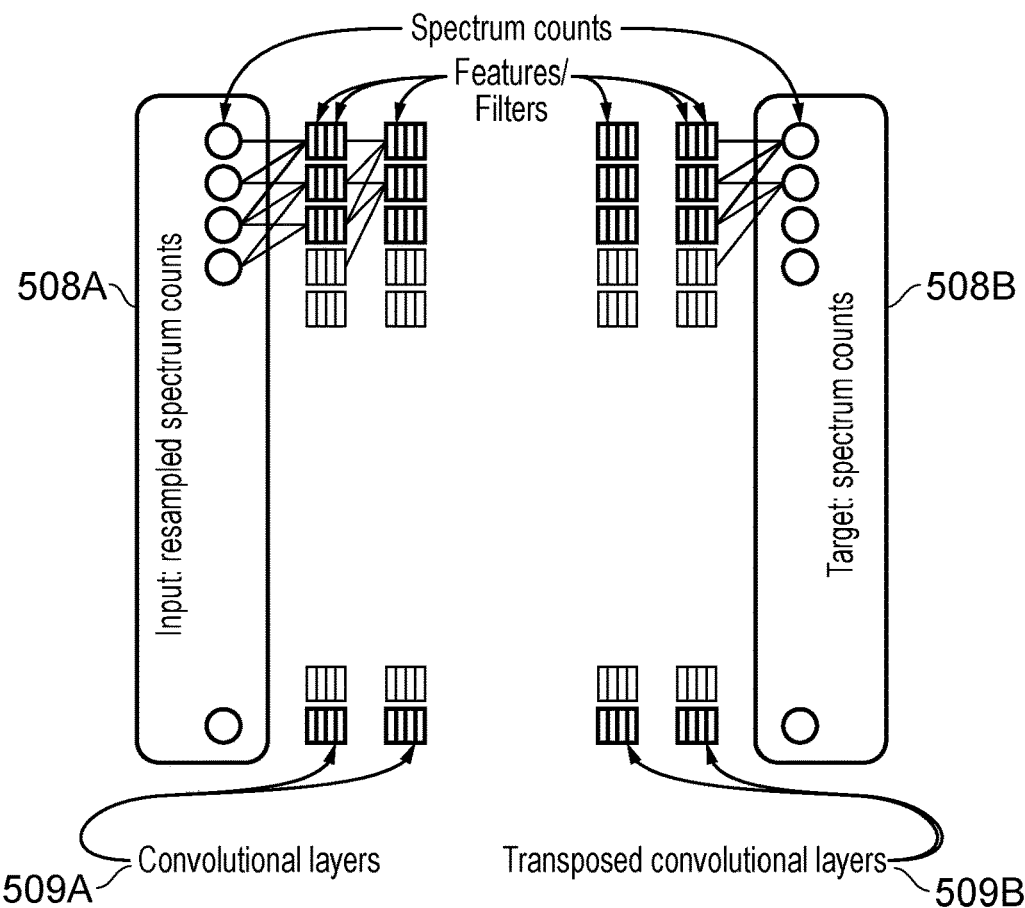

The overall architecture of the autoencoder 203, according to an embodiment, is shown in FIG. 5B. The autoencoder 203 comprises a network with a symmetrical structure of 2N+1 convolutional layers 509A followed by 2N+1 transposed convolutional layers 509B (N being an integer hyperparameter controlling the depth of the network) In an embodiment, N=2. This value of N was found to provide satisfactory results without the network becoming too deep (a deeper network meaning increased processing time). In each convolutional layer, a set of features/filters is created, using a limited number of inputs from the previous layer. The convolutions are un-rolled in the transposed convolutional layers, giving an output of the same dimensions as the input. Residual skip connections (not shown in FIG. 5B) may also be added between the corresponding $(2i)^{th}$ convolutional layer and the $(4N-2i+2)^{th}$ transposed convolutional layer to facilitate training. The network is trained to minimise the difference between the resampled input spectra (generated by the Poisson resampling process at step 507) and the "original" output spectrum (that is, the training gamma-ray spectrum generated at step 501). Each input spectrum is represented by a plurality of counts which are assigned to respective input nodes 508A of the network. Similarly, each output spectrum is represented by a plurality of counts which are assigned to respective output nodes 508B of the network.

In an embodiment, the output and input spectra are deconvolved by deconvoluter 202 prior to being provided to the autoencoder 203. This allows more features to be detected in the spectra (as previously discussed) and hence allows the weights of the autoencoder 203 to be determined more appropriately. This is particularly useful in the case when the sample gamma-ray spectrum and/or background gamma-ray spectrum used to generate each set of output and input spectra used for training the autoencoder 203 are captured using a plastic detector.

Unlike the traditional ways of denoising, e.g., Gaussian filters, etc., which rely on an ad hoc model of the noise distribution, the autoencoder 203 learns to alleviate undesired effects of the noise from real data samples. In this way, the denoising process can be uniquely adapted to the signal processing electronics and for a particular range of detector system designs. When trained, the autoencoder 203 is capable of alleviating uncertainty present in the shape of gamma-ray spectra captured at the RPM due to the Poissonian nature of the radiation. The weights learned by the autoencoder 203 encode the effects of the random nature of radiation on the shapes of the spectra.

The effect of the autoencoder 203 is two-fold. Firstly, the noise in a gamma-ray spectrum captured by the RPM is reduced. Secondly, a set of features of the denoised gamma-ray spectrum is calculated. The set of features is represented by a set of numbers generated as an output of the convolutional layers 509A of the autoencoder. The generated set of numbers has less numbers than the number of counts input to the convolutional layers 509A and is an efficient way of representing the denoised gamma-ray spectrum. It is the generated set of numbers which are input to the classifier 204 in order to classify the gamma-ray spectrum captured by the RPM.

In an embodiment, to improve the performance of the autoencoder 203 when working with spectra that have a large dynamic range of counts (such as are encountered in real applications, where there are typically from $10^2$ to more than $10^8$ counts), the following process is applied to the spectra counts prior to providing them to the neural network of the autoencoder 203:

1. The spectrum counts are scaled to a standard live-time. Thus, for example, if the standard live time is 5 seconds and a spectrum was actually captured over 10 seconds, then the counts of that spectrum are divided by two in order to obtain the counts that would have been expected over 5 seconds.
2. The spectrum counts are then log transformed.
3. The log transformed spectrum counts are then re-binned into a nonlinear energy scale. This ensures that the high energy peaks have approximately the same widths as the low energy peaks. This transform is found to be especially useful in the context of convolutional neural networks (as used for the autoencoder 203). This scale informs the optimal size of the convolutional filter.

Figure 5C:
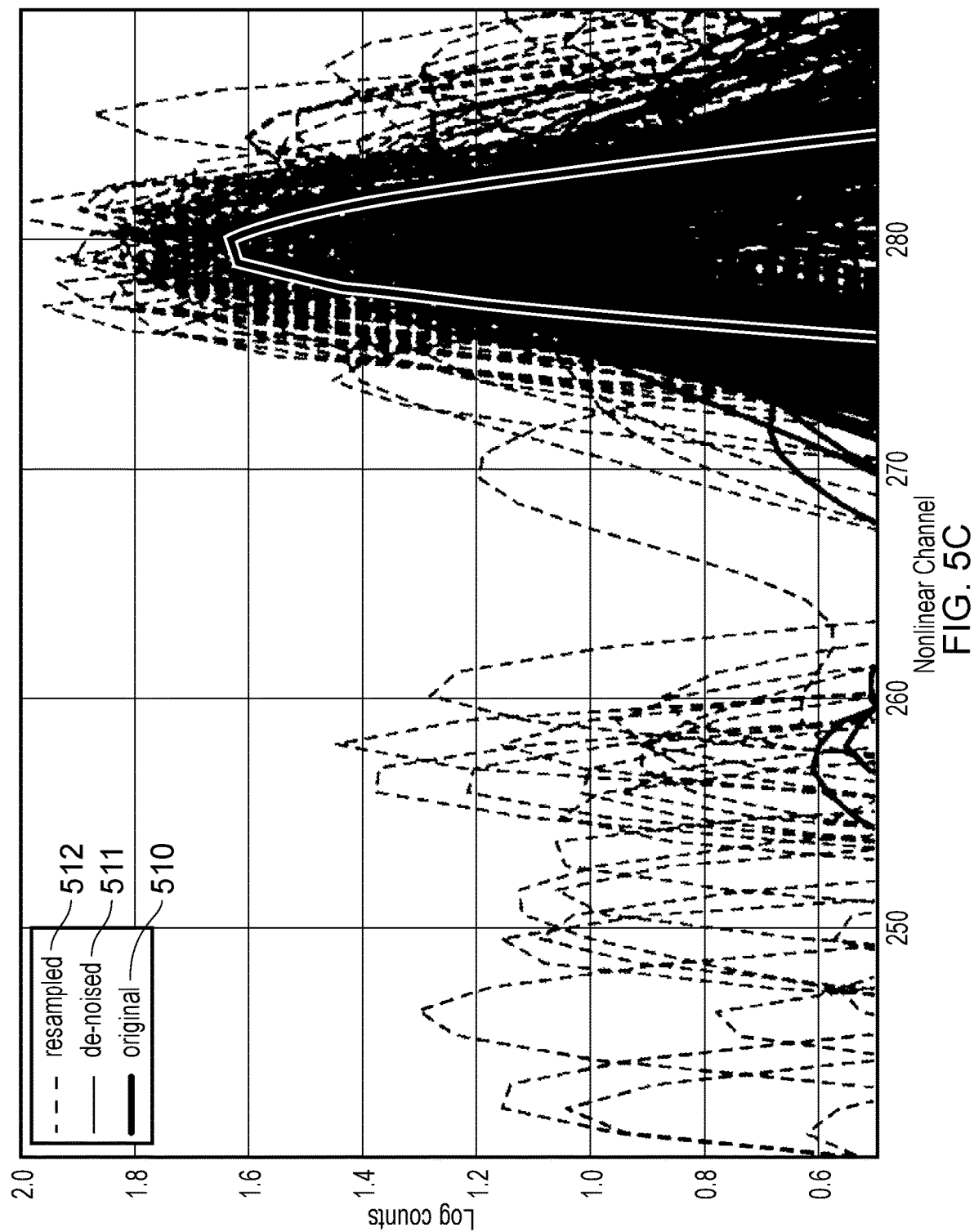

The effect of the autoencoder 203 on the reduction of noise around the high-energy peak of Th-232 (taken from a database of real-life cargo transits) is shown in FIG. 5C. The target spectrum is spectrum 510. The resampled spectra (of which there are 100, in this example) are spectra 512. The spectra uncovered by the autoencoder 203 when the resampled spectra are input to the autoencoder are the spectra 511. In this case, the autoencoder 203 has been trained and therefore the weights of the autoencoder have been determined. Each one of the input resampled spectra 512 (generated by a respective Poisson resampling the target spectrum 512) is processed by the autoencoder using the determined weights to generate a respective one of the output spectra 511. It can be seen that the peaks of the output spectra 511 are grouped more tightly and better represent the true peak of the target spectrum 510. Uncertainty present in the inputs is thus alleviated by the autoencoder 203.

The classifier 204 comprises a deep convolutional classification neural network which is trained to assign identification labels to its inputs. In an embodiment, a deep neural network based on ResNet architecture [10] is used. The classifier 204 is trained by providing training spectra to the classifier together with a classification of each training spectrum. Once trained, the classifier 204 is able to classifier previously unseen spectra into one of the classifications used for training. In one example, the classification comprises "NORM" or "non-NORM". In another example, multiple classifications within NORM can be created such as fertiliser, tobacco, insulation, etc. In another example, the names of the actual isotopes are provided as the classifications (provided that this information is available for the training data).

When a new gamma-ray spectrum is captured at RPM 101, an input to the classifier 204 is constructed by deconvolving the captured gamma-ray spectrum (by deconvoluter 202) and denoising the deconvolved spectrum using the autoencoder 203. The output of the autoencoder is a set of numbers representative of the denoised spectrum. This set of numbers is the input to the classifier 204. The denoising of the spectrum to generate the input to the classifier improves the reliability of the classification output by the classifier 204. In particular, the processing by the autoencoder alleviates the influence of the random nature of the radiation on the spectrum shapes, thereby allowing the deep convolutional neural network of the classifier 204 to reliably classify the captured spectrum based on the feature data (i.e. set of numbers) generated by the autoencoder 203. In an embodiment, the feature data of denoised spectrum is calculated using the weights of the first layer of the autoencoder 203 (the weights having been previously determined during the autoencoder training). In an embodiment, the weights are selected in advance based on the gamma-ray background at the RPM 101 (as previously described).

Figure 6:
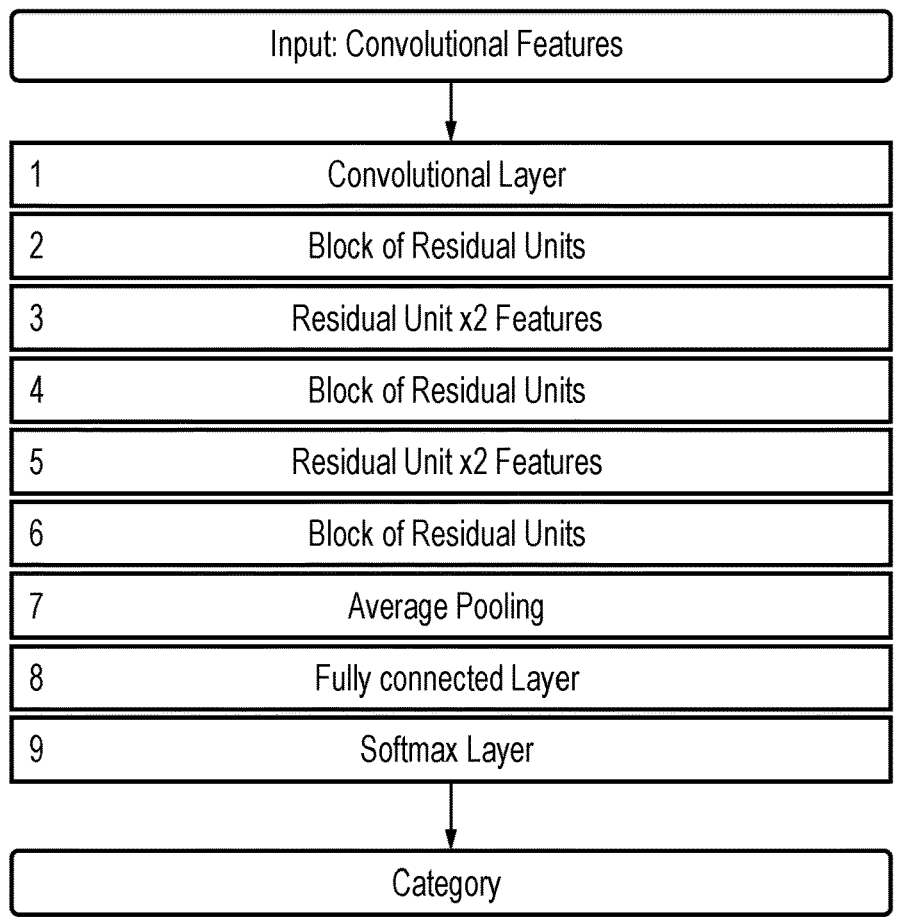
FIG. 6 relates to a classification neural network according to an embodiment.
Figure 6:
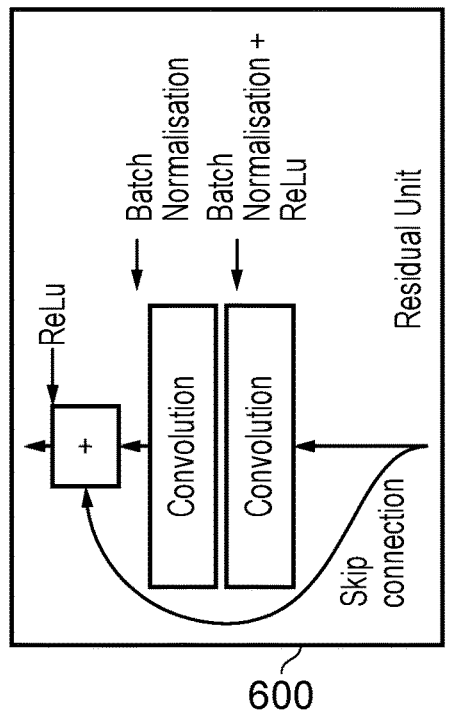

The architecture of the deep convolutional classification neural network of the classifier 204, according to an embodiment, is shown in FIG. 6. It comprises the following blocks:
1. Convolutional layer;
2. Block with several residual units and no down-sampling (keeping the same number of features);
3. Downsampling residual unit (increasing the number of features by a factor of two);
4. Block with several residual units and no down-sampling (keeping the same number of features);
5. Downsampling residual unit (increasing the number of features by a factor of two);
6. Block with several residual units and no down-sampling (keeping the same number of features);
7. Average pooling layer;
8. Fully connected layer;
9. Softmax layer.

It will be appreciated that the depth of the network is restricted compared to ResNet [10] used for image categorisation. This is because the number of categories is not very extensive. The restricted depth of the network reduces the amount of processing required. The number of layers/blocks is another hyper-parameter. The idea of stacking the layers is that the deeper layers can learn more abstract features, using the composition of the features learned by the preceding layers.

Each residual block (blocks 2, 4 and 6 in FIG. 6) consists of five residual units. An example structure of each residual unit 600 is shown in FIG. 6. The specific category is determined as the location of the maximum of the softmax layer (block 9 in FIG. 6).

The architecture of the classifier 204 can be adapted to output any number of suitable classifications (as determined during the classifier training), as previously discussed.

Table 1 shows the categorisation performance for this embodiment when there are two classifications, namely "NORM" and "non-NORM" ("non-NORM" is also referred to as a "THREAT" classification, since the captured gamma-ray spectrum cannot be identified as a "NORM" spectrum and therefore is a potential threat). The performance was assessed based on 6.7 million spectra, using a randomly selected 80% for training (i.e. determining the weights of the classification neural network) and 20% for validation (i.e. testing how well the classification neural network classifies the spectra not used for training using the determined weights). The validation dataset consisted of approximately 1.3 million spectra of which approximately 80% was non-NORM. It can be seen that the categorisation of both "NORM" and "THREAT" materials was accurate in over 99% of cases.

TABLE 1

| Category (truth) | Category (matched) | Percentage |
| --- | --- | --- |
| NORM | NORM | 99.12% |
|  | THREAT | 0.88% |
| THREAT | NORM | 0.22% |
|  | THREAT | 99.78% |

The categorisation was also shown to be over 95% accurate on a smaller dataset with 500,000 spectra with the available manifest information on 26 types of NORM cargo (that is, each of the 500,000 spectra was correctly classified as one of the predetermined 26 types of NORM cargo in over 95% of cases). It will be appreciated that, in the case that the required number of categories is substantially larger, the depth of the network can be extended to ensure high accuracy without losing the training ability.

Thus, with the present technique, an improved categorisation process for gamma-ray spectra recorded at a RPM (in particular, at RPMs comprising plastic scintillator detector systems) is provided. Whereas traditional spectroscopy (e.g. as disclosed in [3]) primarily utilises the location and the intensity of the peaks as the key spectral features, use of convolutional neural networks (as used in the autoencoder 203 and classifier 204 of the present technique) allows a greater range of discriminative features that are present in the data to be used in the classification. Problems related to developing algorithms for finding under-resolved and misshapen peaks and classification of spectra with a strong continuum component (for example the spectra from beta emitters or spectra with a consistent significant contribution from environmental scatter) are therefore alleviated. The latter problem is particularly pertinent for detector systems based on plastic scintillators. The spectra recorded by such systems appear very smooth and the large size of the plastic scintillators means that the detector systems are more affected by environmental scatter (e.g. compared to smaller detectors based on crystal scintillators). Using traditional techniques, spectroscopic categorisation is very difficult. The present technique, however, improved spectroscopic categorisation performance.

It is noted that the neural networks of the autoencoder 203 and classifier 204 have fixed computational costs. Once trained, each network has a constant execution time (determined by the hardware) and a constant computer memory footprint. The execution times in use are therefore typically smaller than the execution times of iterative algorithms addressing the same problem. This is particularly advantageous in portable detector systems, which must continuously assess the input data stream checking for the presence a source. As previously mentioned, a portable detector does not use a previously determined background gamma-ray spectrum from a database, but instead uses a background gamma-ray spectrum captured at the location prior of the portable detector prior to use of the portable detector. The gamma-ray background changes with changes in location due to, for example, changes in the road surface, the proximity of building and bridges and so on. Some portable detectors (such as polyvinyl toluene, PVT, detectors) detectors lack more easily interpretable features as provided by, for example, crystal detectors. However, by training a denoising autoencoder used with such a portable detector in the way as described with a newly captured background gamma-ray spectrum when the portable detector is moved to a new location, spectral classification performance is improved. Learning is computationally intense process. Once the network is trained, however, it has a fixed execution time. This property is important for portable detector systems, as it fixes the minimum physical size of the scanned area (scanned area size =vehicle speed * execution time). That is, if the execution time is fixed, then the minimum physical size of the scanned area for a vehicle travelling through the RPM at a given speed can be determined.

Figure 7:
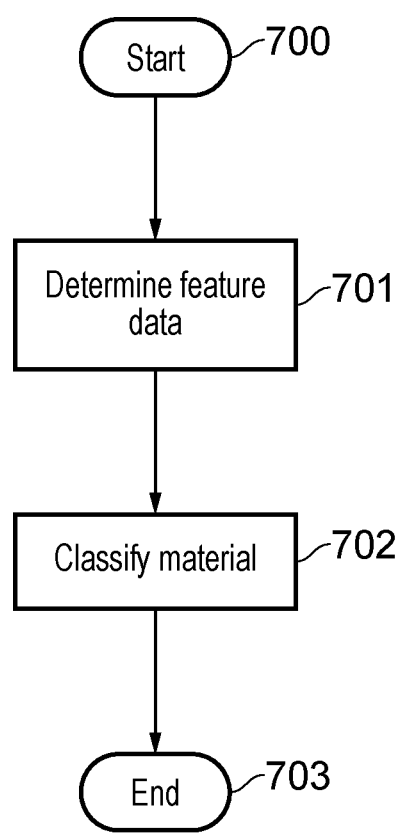
FIG. 7 shows a method according to an embodiment.

FIG. 7 shows a method according to an embodiment. The method is carried out by the data processing apparatus 200. The method starts at step 700. At step 701, the denoising autoencoder 203 receives gamma ray spectrum data representing a gamma ray spectrum of a material to be classified (for example, a material present in a vehicle travelling through the RPM 101). The autoencoder 203 determines feature data indicative of one or more features representative of the gamma ray spectrum data (for example, the feature data being the set of numbers generated to represent the input gamma ray spectrum data). At step 702, the classifier 204 receives the feature data and classifies the material to be classified as one of a plurality of predetermined classifications (for example, "NORM" or "non-NORM" or a particular type of "NORM" material) using the feature data. The method ends at step 703.

The present technique therefore provides improved efficiency and reliability in distinguishing between NORM and non-NORM materials. It is particularly beneficial when using plastic portal monitors. However, it will be appreciated that the present technique could also be used in other applications where there is a need to enhance radiation material (e.g. isotope) identification performance of other gamma-ray spectrometers.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Department of Homeland Security, Domestic Nuclear Detection Office, "Advanced Spectroscopic Program," Request for Proposal, HSHQDC-05-R-00009, Oct. 17,2005

[2] Shea, D. A., Moteff, J. D. and Morgan, D. 2010. "Advanced Spectroscopic Portal Program: Background and Issues for Congress," CRS Rep. Congr. RL34750

[3] Ely, James, Richard Kouzes, John Schweppe, Edward Siciliano, Denis Strachan, and Dennis Weier. 2006. "The Use of Energy Windowing to Discriminate SNM from NORM in Radiation Portal Monitors." Nuclear Instruments & Methods in Physics Research. Section A, Accelerators, Spectrometers, Detectors and Associated Equipment 560 (2): 373-87.

[4] Kamuda, M., J. Stinnett, and C. J. Sullivan. 2017. "Automated Isotope Identification Algorithm Using Artificial Neural Networks." IEEE Transactions on Nuclear Science 64 (7): 1858-64.

[5] Chen, Liang, and Yi-Xiang Wei. 2009. "Nuclide Identification Algorithm Based on K-L Transform and Neural Networks." Nuclear Instruments & Methods in Physics Research. Section A, Accelerators, Spectrometers, Detectors and Associated Equipment 598 (2): 450-53.

[6] Yoshida, Eiji, Kiyoshi Shizuma, Satoru Endo, and Takamitsu Oka. 2002. "Application of Neural Networks for the Analysis of Gamma-Ray Spectra Measured with a Ge Spectrometer." Nuclear Instruments & Methods in Physics Research. Section A, Accelerators, Spectrometers, Detectors and Associated Equipment 484 (1-3): 557-63.

[7] Pilato, V., F. Tola, J. M. Martinez, and M. Huver. 1999. "Application of Neural Networks to Quantitative Spectrometry Analysis." Nuclear Instruments & Methods in Physics Research. Section A, Accelerators, Spectrometers, Detectors and Associated Equipment 422 (1-3): 423-27.

[8] Meng, L. J., and D. Ramsden. 2000. "An Inter-Comparison of Three Spectral-Deconvolution Algorithms for Gamma-Ray Spectroscopy." IEEE Transactions on Nuclear Science 47 (4): 1329-36.

[9] U.S. Pat. No. 7,547,887 B2

[10] He, Kaiming, Xiangyu Zhang, Shaoqing Ren, and Jian Sun. 2015. "Deep Residual Learning for Image Recognition." http://arxiv.org/abs/1512.03385.

[11] Chen, Hu, Yi Zhang, Mannudeep K. Kalra, Feng Lin, Yang Chen, Peixi Liao, Jiliu Zhou, and Ge Wang. 2017. "Low-Dose CT with a Residual Encoder-Decoder Convolutional Neural Network (RED-CNN)." https://doi.org/10.1109/TMI.2017.2715284.

[12] Liu, Jinchao, Margarita Osadchy, Lorna Ashton, Michael Foster, Christopher J. Solomon, and Stuart J. Gibson. 2017. "Deep Convolutional Neural Networks for Raman Spectrum Recognition: A Unified Solution." https://doi.org/10.1039/C7AN01371J .

[13] GB patent GB 2522017
[14] GB patent GB 2418015
[15] GB patent GB 2463707
[16] GB patent GB 2504771

The invention claimed is:

1. A gamma-ray spectrum classification apparatus, comprising circuitry configured:
  to provide a denoising autoencoder to receive deconvolved gamma-ray spectrum data representing a gamma-ray spectrum of a material to be classified and to denoise the deconvolved gamma-ray spectrum data to determine feature data indicative of one or more features representative of the gamma-ray spectrum data; and
  to provide a classification neural network to receive the feature data and to classify the material to be classified as one of a plurality of predetermined classifications using the feature data.

2. The apparatus according to claim 1, wherein the circuitry is configured:
  to provide denoising training data as a target output of the denoising autoencoder, the denoising training data representing a training gamma-ray spectrum for training the denoising autoencoder;
  to resample the denoising training data and provide the resampled denoising training data as an input of the denoising autoencoder;
  to determine weights of the denoising autoencoder based on the input and the target output; and
  to determine the feature data using the determined weights of the denoising autoencoder.

3. The apparatus according to claim 2, wherein the training gamma-ray spectrum comprises a background gamma-ray spectrum combined with a predetermined gamma-ray spectrum of a sample of material.

4. The apparatus according to claim 3, wherein the circuitry is configured to receive background gamma-ray spectrum data representing the background gamma-ray spectrum from a gamma-ray detector located at a location at which the material to be classified is to be located.

5. The apparatus according to claim 1, wherein the circuitry is configured:
  to receive classification training data representing one or more training gamma-ray spectra for training the classification neural network;
  to receive classification information classifying each of the one or more training gamma-ray spectra, the classification information indicating one of the plurality of predetermined material classifications for each of the one or more training gamma-ray spectra;
  to determine weights of the classification neural network based on the classification training data and the classification information;
  to classify the material to be classified using the determined weights of the classification neural network.

6. The apparatus according to claim 1, wherein the material to be classified is classified as either a naturally occurring radiation material (NORM) or a non-naturally occurring radiation material (non-NORM).

7. The apparatus according to claim 6, wherein, when the material to be classified is classified as a NORM material, the material is further classified as one of a plurality of predetermined types of NORM material.

8. A radiation portal monitor comprising a gamma-ray spectrum classification apparatus according to claim 1.

9. A gamma-ray spectrum classification method, comprising:
  receiving deconvolved gamma-ray spectrum data representing a gamma-ray spectrum of a material to be classified and denoising the deconvolved gamma-ray spectrum data to determine feature data indicative of one or more features representative of the gamma-ray spectrum data using a denoising autoencoder; and
  using the feature data to classify the material to be classified as one of a plurality of predetermined classifications using a classification neural network.

10. A non-transitory machine-readable medium comprising a program for controlling a computer to perform a method according to claim 9.

11. A storage medium storing a computer program according to claim 10.

* * * * *